United States Patent [19]

Levesque

[11] Patent Number: 5,040,945
[45] Date of Patent: Aug. 20, 1991

[54] PLASTIC HYDRAULIC TURBINE

[76] Inventor: Normand Levesque, P.O. Box 841, St-Jovite, Province of Quebec, Canada, J0T 2H0

[21] Appl. No.: 409,009

[22] Filed: Sep. 18, 1989

[30] Foreign Application Priority Data

Sep. 13, 1989 [CA] Canada .................................. 611260

[51] Int. Cl.$^5$ ............................................ F01D 15/00
[52] U.S. Cl. ............................ 415/124.1; 415/182.1; 290/52
[58] Field of Search ........................ 290/52, 54, 43; 417/423.6, 423.11, 408, 409; 415/182.1, 183, 200, 208.1, 208.2, 209.2, 209.3, 122.1, 124.1, 211.2, 214.1, 142

[56] References Cited

U.S. PATENT DOCUMENTS

| | | | |
|---|---|---|---|
| Re. 33,142 | 1/1990 | Sato et al. | 417/423.6 |
| 2,509,442 | 4/1945 | Matheisel | 103/89 |
| 2,524,066 | 1/1947 | Andersen | 417/408 |
| 2,761,617 | 9/1956 | Ornum et al. | 417/408 |
| 2,868,439 | 1/1959 | Hampshire et al. | 415/200 |
| 3,087,434 | 4/1963 | Keichenbacher | 417/408 |
| 3,185,854 | 5/1965 | Hoffman | 290/52 |
| 3,188,479 | 6/1965 | Wood et al. | 290/52 |
| 3,441,088 | 4/1969 | Levy | 170/156 |
| 3,487,805 | 1/1970 | Satterthwaite | 115/42 |
| 3,531,214 | 9/1970 | Abramson | 415/68 |
| 3,588,267 | 6/1971 | Wilkinson | 415/135 |
| 3,664,760 | 5/1972 | Reiner | 415/170 |
| 3,863,903 | 2/1975 | Brehmer et al. | 366/174 |
| 4,163,904 | 8/1979 | Skendrovic | 290/54 |
| 4,357,249 | 11/1982 | Mellor | 384/300 |
| 4,367,890 | 1/1983 | Spirk | 290/52 |
| 4,473,754 | 9/1984 | Joy | 290/54 |

FOREIGN PATENT DOCUMENTS

| | | | |
|---|---|---|---|
| 1095588 | 2/1981 | Canada | 322/35 |
| 2706966 | 10/1977 | Fed. Rep. of Germany | 290/52 |
| 1164867 | 10/1958 | France | 415/182.1 |

Primary Examiner—Edward K. Look
Assistant Examiner—Hoang Nguyen
Attorney, Agent, or Firm—ROBIC

[57] ABSTRACT

There is disclosed a hydraulic turbine which is constructed primarily of plastic and uses water to lubricate the bearing joints and gear meshings. The invention provides a turbine which is light in weight for easier installation, low in cost and virtually maintenance free reducing the trouble involved with maintenance and possible breakdown. The invention is well suited to drive an electric turbine for micro-hydroelectric applications.

11 Claims, 2 Drawing Sheets

PLASTIC HYDRAULIC TURBINE

BACKGROUND OF THE INVENTION

The present invention relates to a hydraulic turbine which is constructed primarily of plastic and uses water to lubricate the bearing joints and gear meshings.

The three types of hydraulic turbines presently used to produce electricity are the Pelton wheel, the Kaplan turbine and the Francis turbine. They are all made of steel and require special bearings and transmissions, which must be lubricated with oil and must not come in contact with water. The steel components may suffer damage from corrosion and cavitation. Water-proofing of the bearings and transmission is costly and oil lubrication may require maintenance.

Hydraulic turbines used for small scale hydroelectric generators, known as micro-hydroelectric plants, are generally expensive and not very well suited to their application. The prior art turbines are heavy, expensive to construct and require maintenance. It is desirable with micro-hydroelectric plants to have a turbine generator which is light in weight for easier installation, low in cost since the user is usually an individual and not a utility company, and virtually maintenance free to reduce the trouble involved with maintenance and possible breakdown.

SUMMARY OF THE INVENTION

The present invention provides a light weight, durable, maintenance free and inexpensive hydraulic turbine. The turbine is made using a light weight plastic construction which can be inexpensively molded to create a turbine which is resistant to corrosion and cavitation. The problems of lubrication and water-proofing are substantially reduced by using bearings constructed of water-lubricated plastic which utilize the surrounding water for lubrication and do not require watertight sealing. Thus the turbine according to the present invention offers numerous advantages over the turbines of the prior art.

Some of the advantages of the invention are that water-proofing is greatly reduced so that maintenance is reduced, the bearings and gears are water lubricated by water flowing through the turbine so that oil is not required and therefore lubrication needs no maintenance, the turbine may be constructed by using gravity castable plastic which eliminates any costs of machining, the turbine works well on the 5 to 30 kW scale of generator output, the plastic construction is resistant to the damages of cavitation, corrosion, and wear due to possible particles in the hydraulic flow, and the gears of the transmission having water lubricated plastic teeth provide a soft transmission and create little noise. The turbine according to the invention is of the Kaplan type with distributors placed upstream.

More specifically, the present invention provides a hydraulic turbine comprising a rotor having a hub with a longitudinal axis and turbine blades extending radially from the hub, a gear solid with the rotor, drive means including at least one gear meshed with said gear solid with said rotor to give drive to or obtain drive from the rotor, a surrounding housing containing the rotor, and mounting means for rotatably mounting the rotor in the housing to secure the rotor against longitudinal and radial forces during operation. The turbine is improved according to the invention in that the gear of the drive means meshed with the rotor gear has teeth made of a water lubricated plastic material having a low coefficient of friction, the gear connected to the rotor also has teeth made of the same plastic material, the rotor is made of the same plastic material, the mounting means includes bearing means made of the plastic material, the bearing means being coaxial with the longitudinal axis, and the gear or gears of the drive means, the gear connected to the rotor and the bearing means being all contained within the housing and lubricated, in operation, by water passing through the housing.

The transmission to an electric generator is advantageously achieved in a preferred embodiment of the invention by providing a rim connected around the blades, which gives the rotor an advantageously larger rotational inertia, the rim being provided with a gear defining surface which forms said gear solid with the rotor and meshes with the gear of the drive means to the generator. The gear ratio between the rim surface and the drive means gear is suitable to drive the generator at an appropriate rotational speed, thus the transmission is simplified. The assembly of the turbine as a whole is simplified by constructing the housing in two plastic parts, into which the rotor, mounting means, and gears are placed. The number of components of the turbine can be reduced to less than six.

Other objects and features of the present invention will be made clear by means of the following description of a preferred embodiment of the invention taken in connection with the accompanying drawings.

DETAILED DESCRIPTION OF THE PREFERRED EMBODIMENT

Figure 1:
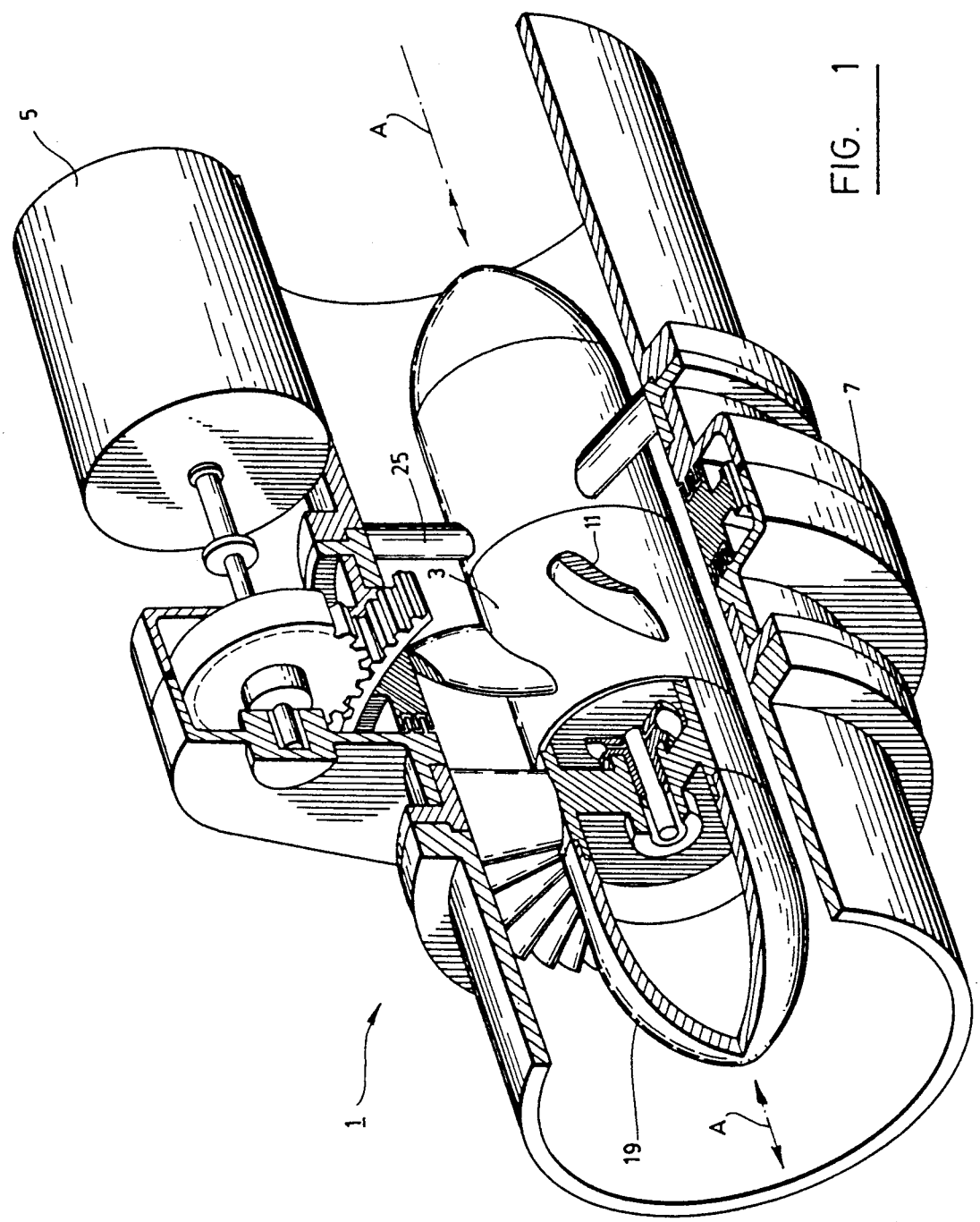
FIG. 1 is a partly cut away perspective view of the turbine and generator according to a preferred embodiment of the invention.

The hydraulic turbine 1 according to the invention as shown in FIG. 1 comprises a rotor 3 from which blades 11 extend radially, a housing 7 and a generator 5.

Figure 2:
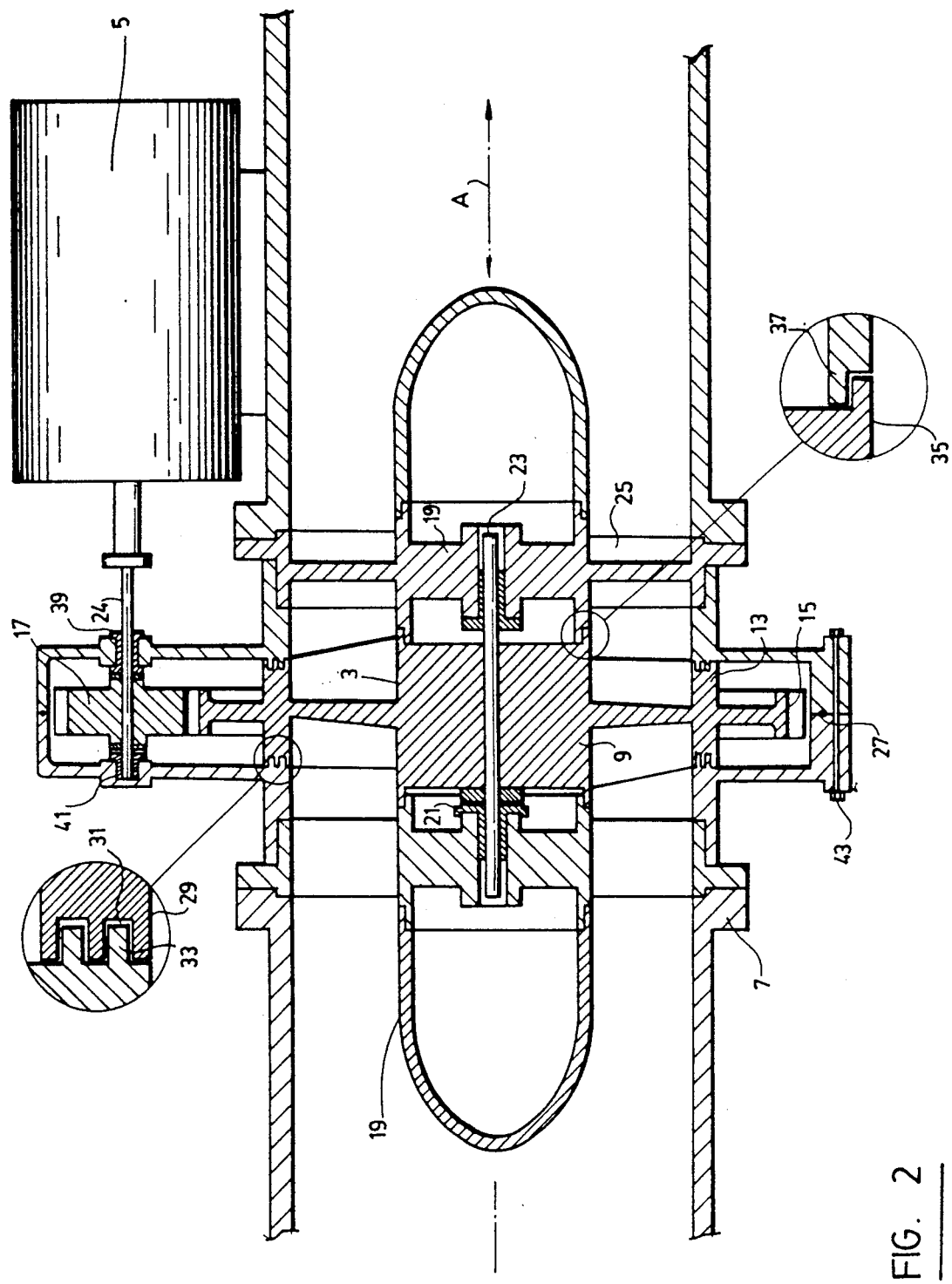
FIG. 2 is a cross-section of the turbine according to the present invention taken in a vertical plane through the axis A.

As better shown in FIG. 2, the rotor 3 is provided with a center hub 9 and an annular rim 13 connecting the blades 11. The rotor rotates on a shaft 23 which is connected at each end to bearings 21 which seat into mounting means 19. The mounting means 19 comprises a nose cone and a tail cone.

Construction and assembly of the hydraulic turbine 1 is simplified by forming the turbine housing 7 in two halves which are joined together by 0-ring 27 and bolts 43. The mounting means 19 are attached to each respective half of the housing 7 by struts 25.

The turbine 1 comprises for the most part only four major pieces, namely the two halves of the housing 7, the rotor provided with shaft 23 and bearings 21, and gear 17 provided with a shaft 24 and bearings 41. As a result, assembly of the turbine 1 is not complicated and requires little time.

In the preferred embodiment of the invention, the turbine 1 is used to drive a generator 5. The annular rim 13 is provided with a ring gear surface 15 which meshes with gear 17 contained on the drive shaft 24. The drive shaft 24 is provided with bearings 41 and a watertight seal 39 to rotatably connect the gear 17 to the generator 5.

In the preferred embodiment all components are made of a plastic material which is capable of being water lubricated except for the shafts 23, 24, the O-ring seal 27 and the bolts 43. The shafts 23, 24 are preferably made of stainless steel. The water lubricated plastic is polyurethane.

The water lubrication requires that water be free to circulate about the bearing joints 21 and 41 and at the meshing between the gear 17 and the gear surface 15. The water circulating about the joints should be free of abrasive particles, such as sand. In the preferred embodiment shown, the hydraulic turbine 1 may be connected to a flow of water derived from a stream for microhydroelectric purposes. In this case, there will be fine particles such as sand in the flow of water in the housing 7. Therefore the surface of the rotor 3 where the rotor 3 meets the surface of the housing 7 and the mounting means 19 is firstly made flush, so that a minimum of turbulence is created by the joint, and secondly, a tongue and groove arrangement is provided to restrict the flow of water and thereby also the flow of water with abrasive particles into the chamber surrounding the gear 17 and the chamber surrounding the bearings 21. More specifically the surface 29 of the rotor 3 is made flush with the interior surface of the housing 7 and the rim 13 is provided with annular grooves 31 which receive annular flanges 33 of the housing. At the interface between the rotor 3 and the mounting means 19, there is provided only a single tongue and groove arrangement, comprising a surface ridge 35 projecting into a groove next to an annular flange 37. Similarly, the interface between the surface of the rotor at the ridge 35 is flush with the surface of the mounting means 19 so that turbulence at the interface is minimized.

As can now be understood, the turbine design according to the present invention is based on using plastic in most every part of the turbine 1. The turbine 1 is of the Kaplan type and the upstream struts 25 also act in the preferred embodiment as distributors. The torque is transmitted to the generator 5 by pair of gears 15, 17 of the necessary ratio. The gear 15 is situated at the circumference of the blades 11 of the rotor 3 and the other gear 17 on the shaft 24 of the generator 5. Both gears 15,17 are held in place by two parallel stainless steel shafts 23,24 that turn in self-lubricated plastic bearings 21,41 immersed in water. Also for lubrication, the gears 15,17 are immersed in water. A non-watertight mechanical joint assures that the pressure of the water is all used by the blades 11 of the propeller rotor 3. The water going through the mechanical joint will then lubricate the gears 15,17. All the major parts of the turbine except the two stainless steel shafts 23,24 are made of plastic.

The advantages of the structure are as follows. Watertightness is not required which assures water lubrication of every part in friction contact, such as the teeth of the plastic gears 15,17 and bearings 21,41. The gear 15 provided on rim 13 is deliberately oversized to provide sufficient inertia for easy speed control. The use of plastic provides a very light weight machine which simplifies the installation of the turbine 1. Low cost of the turbine 1 is realized by the ease of molding gravity castable plastic which avoids expensive machining. The turbine 1 is built for low output (5 kW to 30 kW) but of course the design can be adapted for larger power output ($\geq$ 100 kW). A simple construction is achieved by modular assembly of all the parts which further makes the installation and transportation easier. Only six major parts and four bearings form the turbine 1. No specialized labor is required for the assembly. Plastic will not corrode like steel, and the turbine 1 requires low maintenance.

The advantages of using a water lubricated plastic, whose characteristics permit a low cost and rapid production, and a long life for all the parts of the turbine 1, are as follows. The type of plastic used in the turbine is a gravity castable type. To produce large parts used in turbines at a low cost, it is necessary to use a gravity castable type of plastic, since the molding pressure of nongravity castable plastic can reach 12000 psi, and therefore the force needed to keep two faces of a mold together is very great. Such great forces complicate, if not render impossible, the construction of the mold. The disadvantages of non-gravity castable plastic for large turbine components can result in a higher production cost.

Kaplan turbines are prone to problems of cavitation. The cavitation is often the result of operating outside design parameters. Cavitation refers to the small implosions which are created on the blades 11 at points where the hydraulic pressure fluctuates from very low to very high in a very short time frame. The cavitation implosions can be compared to shocks. Therefore, the plastic used in the turbine 1 has to resist high shocks, which is achieved by the elasticity of the plastic material. However, the plastic used must be rigid enough not to twist or bend under the loads created by the water pressure on the blades 11 and the struts 25. The plastic used is corrosion free to avoid degradation of the plastic due to long exposure to water, resists the friction created by sand contained in the water, and is capable of being water lubricated for the parts in friction contact such as the teeth of the gears 15,17. Two examples of gravity castable plastic are urethane and epoxy.

The turbine 1 according to the invention relies upon non-watertight mechanical joints to allow water passing through the turbine 1 to lubricate the gears 15,17 and the bearings 21,41. The mechanical joint must limit the flow of water such that the gears 15,17 and bearings 21,41 are sufficiently lubricated and all the water pressure is used by the rotor blades 11. The tongue and grooves 29,33,31 and 35,37 of the rim 13 and the hub 9 respectively, are not in contact to avoid friction which can reduce torque considerably.

The use of plastic for the construction of both water lubricated gears 15,17 permits a soft transmission of torque with a low noise level. Moreover the construction allows a looseness of both gears' 15,17 tooth profile and center line distance without negative results on the life of the gear teeth or on the smoothness of the torque to be transmitted.

In the above description, although reference has been made to the use of water in the turbine, it is to be understood that any hydraulic fluid, which can lubricate the plastic gear teeth and bearings, may be used instead of water.

Although the description of the present invention has been made by reference to the preferred embodiment, it is to be understood that the above description is not to be limitive of the scope of the present invention as defined in the following claims.

I claim:
1. An axial flow water turbine comprising:
 a watertight housing having an inlet and an outlet through which water may flow;
 a rotor having a hub with a longitudinal axis, and turbine blades extending radially from the hub;

an annular rim surrounding and connecting the blades of the rotor, the rim having a substantially cylindrical interior surface and an outer surface provided with plastic gear teeth made of a water lubricated plastic material having a low coefficient of friction;

mounting means for rotatably mounting the rotor in the housing to secure the rotor against longitudinal and radial forces during operation, the mounting means including at least one bearing made of said plastic material, the bearing being coaxial with said longitudinal axis;

at least one drive gear meshed wit the teeth of the annular rim to give drive to or obtain drive from the rotor, said at least one drive gear having teeth made of said plastic material;

the housing further comprising:

a substantially cylindrical inner shell having an upstream and a downstream portion coaxial with said longitudinal axis and aligned with the interior surface of the rim;

a first compartment surrounding the outer surface of the rim and containing said at least one drive gear; and a second compartment surrounding said at least one bearing;

a first annular upstream passage between the rim and upstream portion allowing water to pass between the shell and the first compartment;

a second annular downstream passage between the rim and the downstream portion allowing water to pass between the shell and the first compartment, a flow through said shell causing a circulation of water in the first compartment by water passing in the first passage and out the second passage or in the second passage and out the first passage;

a third annular passage between the hub and the mounting means allowing water to pass between the shell and the second compartment, whereby water passing through the housing fills the first and second compartments and provides lubrication for said plastic material.

2. The water turbine according to claim 1, wherein the rotor is provided with a shaft coaxial with said longitudinal axis in the center of the hub, wherein the mounting means include two bearings made of said plastic material, the two bearings being mounted at each end of said shaft, and wherein the mounting means are fixed to the housing by struts, a seat of each said bearing being supported by said struts at each end of said shaft, said struts being connected to the housing.

3. The water turbine as claimed in claim 2, wherein the outer surface provided with plastic gear teeth of the rim has its normal directed perpendicularly to said longitudinal axis, and the at least one drive gear has its axis of rotation parallel to said shaft.

4. The water turbine as claimed in claim 3, wherein the first and second annular passages comprise an annular labyrinth passage formed by tongues and grooves provided on the rim and a respective one of the portions of the cylindrical shell.

5. The water turbine as claimed in claim 3, wherein the third annular passage comprises a labyrinth passage provided by annular tongues and grooves provided on the hub and the mounting means.

6. The water turbine as claimed in claim 3, wherein the housing, the rim, the turbine blades and the mounting means are made of said plastic material.

7. The water turbine as claimed in claim 6, wherein said plastic material is polyurethane.

8. The water turbine as claimed in claim 1, wherein the first and second annular passages comprise an annular labyrinth passage formed by tongues and grooves provided on the rim and a respective one of the portions of the cylindrical shell.

9. The water turbine as claimed in claim 1, wherein the third annular passage comprises a labyrinth passage provided by annular tongues and grooves provided on the hub and the mounting means.

10. The water turbine as claimed in claim 1, wherein the housing, the rim, the turbine blades and the mounting means are made of said plastic material.

11. The water turbine as claimed in claim 9, wherein said plastic material is polyurethane.

* * * * *